(12) United States Patent
Valeriano

(10) Patent No.: US 6,422,658 B1
(45) Date of Patent: Jul. 23, 2002

(54) BRAKE PEDAL SENSOR AND ELECTRONIC SWITCH

(75) Inventor: Frederick Valeriano, Prospect, CT (US)

(73) Assignee: Carling Technologies, Inc., Plainville, CT (US)

(*) Notice: Subject to any disclaimer, the term of this patent is extended or adjusted under 35 U.S.C. 154(b) by 0 days.

(21) Appl. No.: 09/710,019

(22) Filed: Nov. 10, 2000

(51) Int. Cl.$^7$ .................................................. B60L 7/00

(52) U.S. Cl. .................... 303/3; 303/20; 188/112 R; 188/158; 200/61.89

(58) Field of Search .......................... 303/3, 155, 113.4, 303/20, 7, 15–19, 24.1; 340/479, 467; 188/112 R, 34, 3 R, 156, 158, 1.11; 701/70; 74/512, 514; 324/207.2, 207.26, 207.22; 73/862.625

(56) References Cited

U.S. PATENT DOCUMENTS 5,439,275 A * 8/1995 Padula et al. .................. 303/3

* cited by examiner

*Primary Examiner*—Douglas C. Butler
(74) *Attorney, Agent, or Firm*—McCormick, Paulding & Huber LLP

(57) ABSTRACT

A brake pedal position circuit includes a brake pedal mechanism having a ferromagnetic portion, which is movably mounted in a motor vehicle. At least one permanent magnet for generating a magnetic field is provided, as well as at least one Hall effect device for generating output data states that are dictated by variations in the magnetic field. A housing for the permanent magnet and the Hall effect device is fixedly secured in the vehicle so as to provide a portion in proximate relation to the brake pedal ferromagnetic portion when the brake pedal is in an "at rest" position. Movement of the brake pedal mechanism in the vehicle changes the magnetic field and causes a resulting change in the Hall effect device data state.

22 Claims, 4 Drawing Sheets

BRAKE PEDAL SENSOR AND ELECTRONIC SWITCH

FIELD OF THE INVENTION

This invention relates in general to an electronic switch, and deals more particularly with a brake pedal sensor and electronic switch that operates to accurately detect the presence of a brake pedal in a motorized vehicle without the need for mechanical contacts, and which is capable of performing high current and low signal switching of auxiliary components.

BACKGROUND OF THE INVENTION

In many diverse fields reliable switches are integral to the operation of the apparatus or device in which they are utilized. These switches are typically overlooked by most causal observers, but one so skilled in the art will recognize that these devices perform operations which are absolutely vital to the applications in which they are employed. Common to each of these many applications is the need to incorporate switches having high reliability and repeatability, qualities which are of no small consequence given the repeated use of these actuators which may number in the millions of cycles during the lifetime of the switches.

One such example of an electronic switch is as an incorporated element of an electronic circuit. In such applications where physical, non-electronic communication is utilized as the impetus for altering the data state of the switch, mechanical contacts are employed to detect and transmit such communication. As will be appreciated, the repeated contact between these elements in conjunction with environmental effects and manufacturing concerns results in wear and corruption of the contacting portions of the switch.

In particular, many motorized vehicles typically utilize brake pedals for initiating a braking action of the vehicle while simultaneously illuminating the brake lights. In such configurations, the movement of the brake pedal is determined by known mechanical contacts, which suffer from the debilitating effects of wear and corrosion, as discussed previously. As will be appreciated in applications involving motorized vehicles, degradation of these mechanical switching elements can be potentially life threatening, therefore increasing the need for a more reliable and repeatable switching apparatus.

In addition to mechanical wear, existing brake pedal configurations present other safety concerns, namely, the actuation of the braking system of a motorized vehicle during those times when the engine of the vehicle is not operating. Many large-scale vehicles, such as construction vehicles, utilize pneumatic or hydraulic braking systems, which must be pressurized during engine operation in order to function. Known brake pedal configurations, therefore, suffer from an inability to adequately respond to a braking command when the engine is not running.

It is therefore an object of the present invention to construct an electronic switch, which does not require mechanical contacts to generate a plurality of data states.

It is another object of the present invention to utilize a magnetic field of a permanent magnet in the performance of a switching operation.

It is another object of the present invention to construct a brake pedal sensor, which is largely impervious to the debilitating effects of structural wear and adverse environmental conditions.

It is another object of the present invention to increase the reliability and repeatability of a brake pedal sensor.

It is another object of the present invention to integrate a brake pedal sensor in the circuitry of a motorized vehicle to enable the switching of high current auxiliary devices.

It is another object of the present invention to integrate a brake pedal sensor in the circuitry of a motorized vehicle so as to enable operation of a pneumatic or hydraulic braking system even during those times that the engine is not running.

With the forgoing problems and concerns in mind, the present invention therefore seeks to eliminate the need for mechanical contact between elements of a brake pedal sensor, as well as enabling operation of a pneumatic or hydraulic braking system even when an engine of the motorized vehicle is not running.

SUMMARY OF THE INVENTION

According to one embodiment of the present invention, a Hall effect transistor and permanent magnet assembly is utilized to detect the position of a ferromagnetic portion of a brake pedal mechanism in a motorized vehicle. When movement of the brake pedal mechanism is so detected, the brake lights of the vehicle are then activated without the need for mechanical contacts between electrical switching elements. The present invention therefore avoids the wear and environmental corruption, which typically affects these mechanical systems. By utilizing a permanent magnetic in fixed relation to the Hall effect transistor, the present invention substantially eliminates spontaneous activation of the braking system of the vehicle due to unintended fluctuations in the magnetic field incident upon the Hall effect transistor. Moreover, the use of MOSFET technology in conjunction with the Hall effect transistor advantageously allows for the switching of high current electrical components. The present invention also provides an additional measure of safety for those vehicles utilizing pressurized hydraulic or pneumatic braking systems by ensuring that these systems become operative even when the engine of the vehicle is off.

These and other objectives of the present invention, and preferred embodiments thereof, shall become clear by consideration of the specification, claims and drawings taken as a whole.

DETAILED DESCRIPTION OF THE PREFERRED EMBODIMENT

Figure 1:
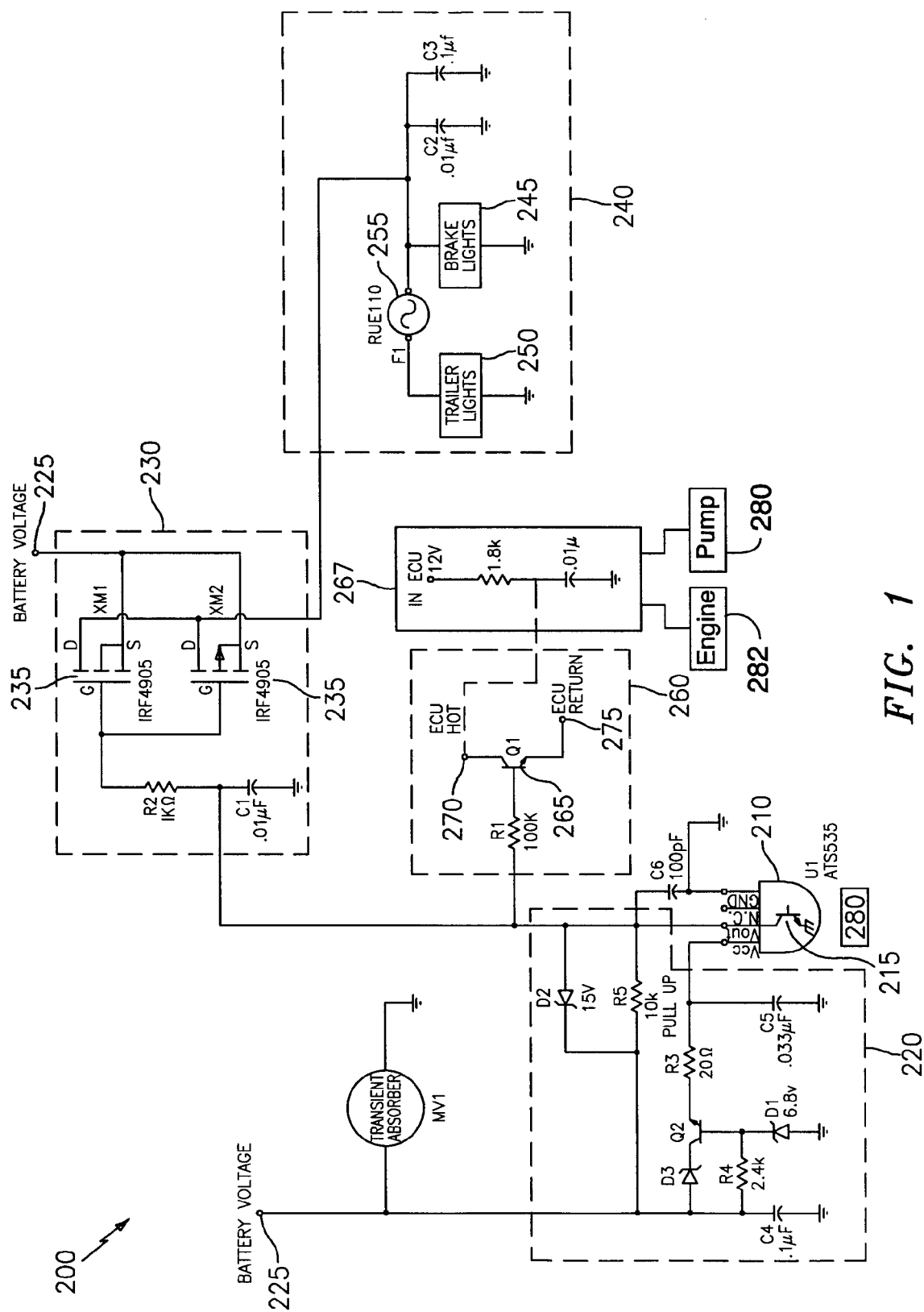
FIG. 1 is a schematic diagram of an electronic switch, depicting a brake pedal position circuit for a motorized vehicle, according to one embodiment of the present invention.

As depicted in FIG. 1, a brake pedal position circuit 200 is arranged to detect the movement of a brake pedal in a motorized vehicle and to switch the brake lights and engine control signal of the vehicle either on or off in response to this movement.

The brake pedal position circuit 200 of FIG. 1 is formed on an unillustrated circuit board, or the like, and utilizes at least one Hall effect transistor 215 incorporated into an integrated magnetic sensor assembly 210. The Hall effect transistor 215 essentially functions as a switching device, alternatively outputting a digital 'high' or a digital 'low' signal in dependence upon a change in magnetic flux experienced by the Hall effect transistor 215, to be described in more detail below. A power supply circuit 220 is provided to generate a dc-voltage to energize the chip 210 from the vehicle's power supply 225. Known resistor-capacitor (RC) configurations are utilized in the power supply circuit 220 to eliminate any electromagnetic interference before presentation of the energizing voltage to the chip 210.

Returning to FIG. 1, an enabling circuit 230 utilizes a pair of MOSFETs 235 as switching elements to be connected in parallel to each other. The MOSFETs 235 are configured to enter a conducting mode in response to a digital 'low' signal being applied thereto. When placed in the conducting mode, the MOSFETs 235 will pass an enabling current from the power supply of the vehicle 225 to a load circuit 240. The load circuit 240 is also provided with an auxiliary load receptacle 250 for electrically enabling trailer lights of the vehicle, or the like. The load receptacle 250 is protected through the use of a poly-switch fuse 255 having a predetermined current rating, preferably on the order of approximately 1 amp.

One important aspect of the present invention, therefore, is that the enabling circuit 230 utilizes the MOSFETs 235 as enabling transistors due to their ability to handle high switching currents. This use becomes especially important when the primary load 245 takes the form of the brake lights of the vehicle, typically drawing on the order of approximately 14 amps.

In operation, the brake pedal position circuit 200 is mounted within a sensor housing 300 (to be described in more detail later) and includes a permanent magnet 280 or an equivalent, such as an electromagnet, fixedly positioned in close proximity to the Hall effect transistor 215 of the chip 210. The sensor housing 300 is then positioned adjacent a ferromagnetic portion of the brake pedal mechanism such that movement of the brake pedal will cause a change in the magnetic flux acting on the chip 210, thereby triggering a change in the data state outputted by the Hall effect transistor integrated therein. The sensor housing 300 is preferably mounted adjacent a movable ferromagnetic brake shaft 302 (FIG. 3) extending from a brake pedal 304 (FIG. 3) into the interior housing of the vehicle, but may be alternatively mounted in close proximity to any ferromagnetic portion of the brake pedal mechanism, including adjacent the ferromagnetic brake pedal 304 itself.

In the preferred embodiment of the present invention, a ferromagnetic portion of the brake pedal mechanism will be oriented adjacent the chip 210 in its rest position, during which time the Hall effect transistor 215 will be non-conductive and outputting a digital 'high' signal to the MOSFETs 235. The enabling circuit 230 will therefore be isolated and prevented from energizing the primary load 245. As utilized hereinafter, the term 'rest position' refers to the position of the brake pedal mechanism prior to depression of the brake pedal by an operator of the vehicle during a braking operation.

As an operator of the vehicle presses on the brake pedal 304, the ferromagnetic portion of the brake pedal mechanism is distanced from the chip 210 and the permanent magnet 280. In response to this movement of the brake pedal 304 and the associated flux in the magnetic field experienced by the chip 210, the Hall effect transistor 215 will trigger, or change its data state, from outputting a digital 'high' to a digital 'low' signal to the MOSFETs 235. The enabling circuit 230 will subsequently become energized, thereby allowing the MOSFETs 235 to conduct and pass the enabling current to the primary and auxiliary loads, 245 and 250 respectively. Return of the brake pedal 304 to its rest position will cause the ferromagnetic portion of the brake pedal mechanism to come to rest adjacent the chip 210, again causing the Hall effect transistor 215 to enter a non-conductive, 'high' output, state and cutting off the enabling current to the primary and auxiliary loads, 245 and 250 respectively.

In this manner, the electronic switch depicted in FIG. 1 accomplishes the intermittent actuation of the brake lights of a motorized vehicle without the need for mechanical contacts. Moreover, another inventive aspect of the present invention resides in the utilization of the Hall effect transistor 215 to trigger the MOSFETs 235, thereby enabling the switching of vehicle loads drawing large currents.

As an additional feature of the present invention, the brake pedal position circuit 200 of FIG. 1 also provides an added measure of safety for those vehicles utilizing hydraulic or pneumatic braking systems, such as tractor trailers, construction vehicles or the like, by ensuring that the braking system will engage even when the engine of the vehicle is not operating. An engine control circuit 260 is employed for this purpose and is integrated into the operational circuitry depicted in FIG. 1.

Typically, an engine-driven pump device 280 is utilized to pressurize the brake system of vehicles equipped with either hydraulic or pneumatic brakes. When the engine 282 of a vehicle is not operating, however, the hydraulic or pneumatic brakes are not pressurized by the pump device and therefore the brake system of such a vehicle does not engage when an operator presses upon the brake pedal. As configured in FIG. 1, an engine control switching transistor 265 of the engine control current 260 becomes conductive in opposition to the conditions which cause the MOSFETs 235 to conduct; that is, in response to the ferromagnetic portion of the brake pedal mechanism being oriented adjacent to the chip 210. When conductive, the engine control switching transistor 265 passes the operational current to an engine control unit 267 of the vehicle, thereby deactivating the pump device 280 of the vehicle.

In contrast, when the ferromagnetic portion of the brake pedal mechanism is shifted from its rest position, away from the chip 210, the Hall effect transistor 215 outputs a digital 'low' signal and places the engine control switching transistor 265 into a non-conductive state. The operational current to the engine control unit 267 is then interrupted, signaling to the engine control unit 267 to activate the pump device 280 of the vehicle. In this manner, the pump device 280 becomes active even when the engine 282 of the vehicle is not running. Moreover, as discussed previously, the 'low' signal outputted by the Hall effect transistor 215 simultaneously energizes the primary and auxiliary loads of the vehicle, 245 and 250 respectively, thereby causing illumination of the vehicle's brake lights or the like.

It will be readily appreciated that the switching transistor 265 indirectly energizes the pump device by enabling the engine control unit 267 to sense the depression of the brake pedal 304 and subsequently pressurize the brake system accordingly. While a switching transistor 265 has been depicted in FIG. 1, the present invention is not limited in this regard as alternative switching elements may be employed, provided they are capable of selectively completing the conductive path between a power supply terminal 270 and a return terminal 275 of the engine control unit in response to a digital 'high' signal, without departing from the broader aspects of the present invention.

It should also be appreciated that while the specific architecture for the brake pedal position circuit 200 of FIG. 1 has been described, the present invention is not limited in this regard as alternative circuit elements and configurations may be employed as well, without departing from the broader aspects of the present invention.

Figure 2:
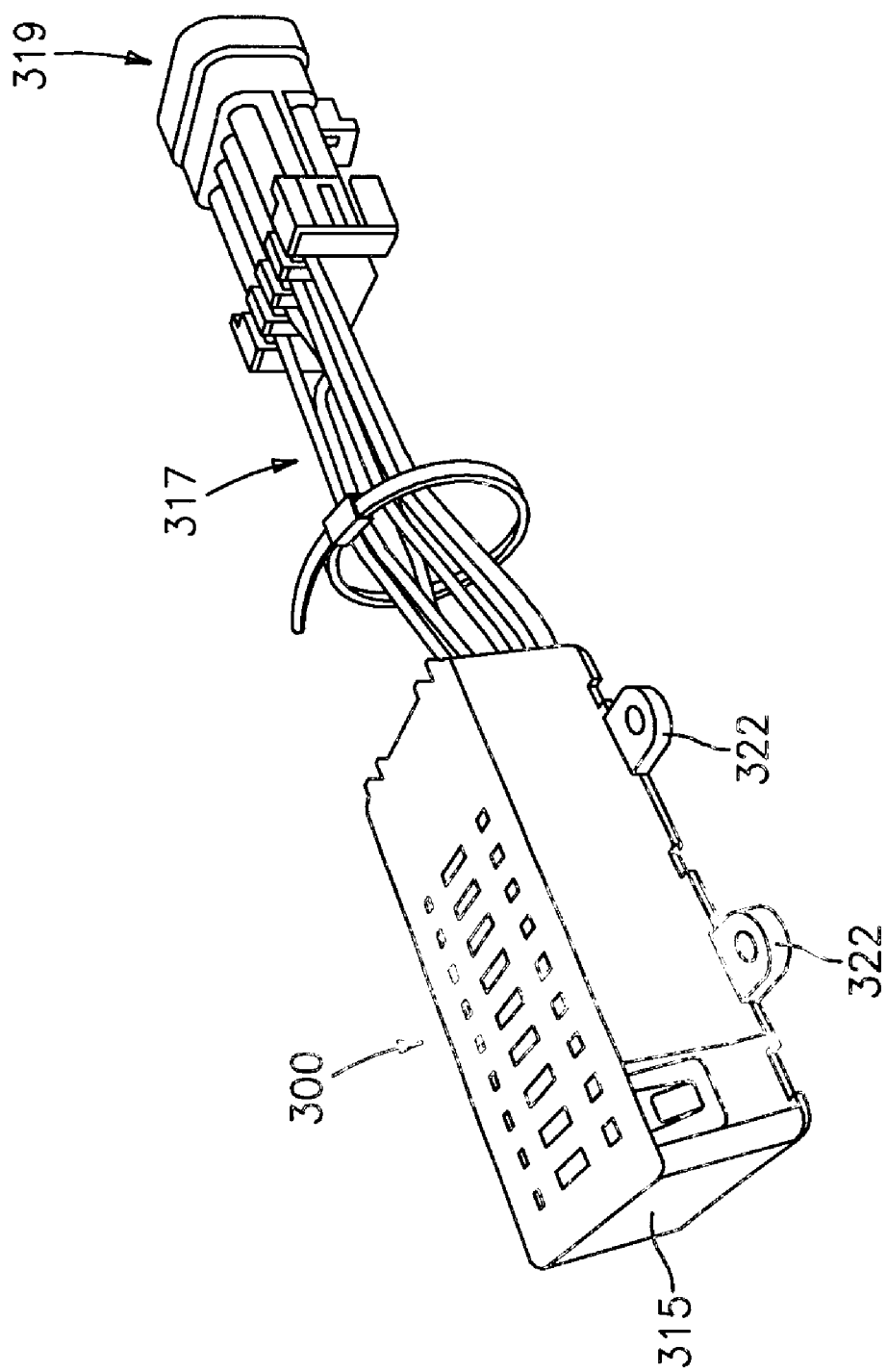
FIG. 2 is a perspective view of a sensor housing for the brake pedal position circuit depicted in FIG. 1.
Figure 4:
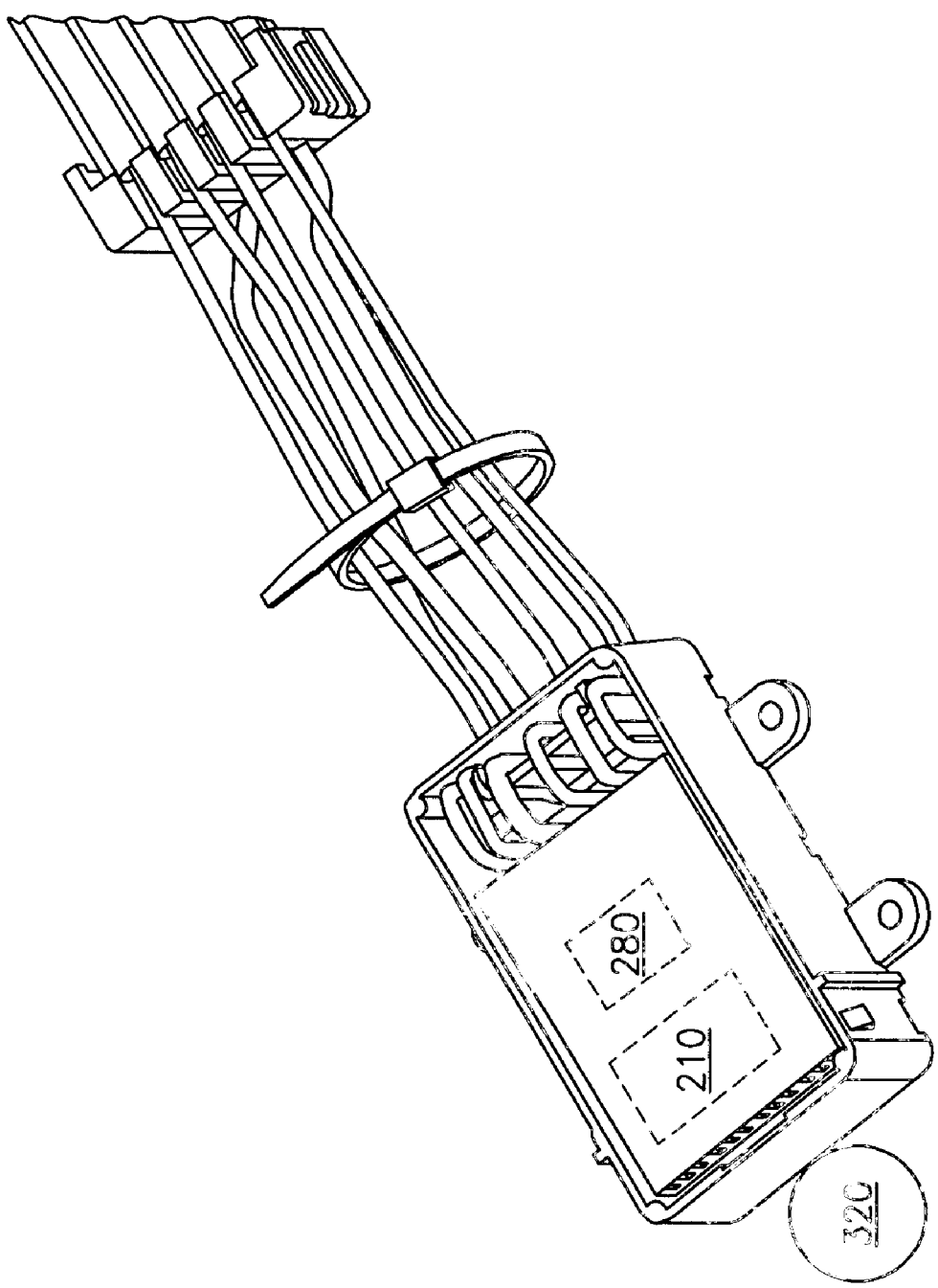
FIG. 4 is a schematic view of the interior of the brake pedal position sensor housing.

As shown in FIGS. 2 and 4, the chip 210 and the permanent magnet 280 are removably housed within a sensor housing 300. A non-magnetic, non-conductive fiber pad 315 may be mounted on the front outer face of the sensor housing 300 for contact with the ferromagnetic portion of the brake pedal mechanism, thereby providing a visual and tactile indication that the sensor housing 300 is positioned the correct distance from the brake pedal mechanism; that is, the fiber pad 315 has a predetermined thickness indicative of the mounting distance between the sensor housing 300 and the ferromagnetic portion of the brake pedal mechanism. As further depicted in FIG. 2, a grouping of contact wires 317 may be bound together to extend from the sensor housing 300 for connection with the electrical system of the vehicle via a coupling 319.

Figure 3:
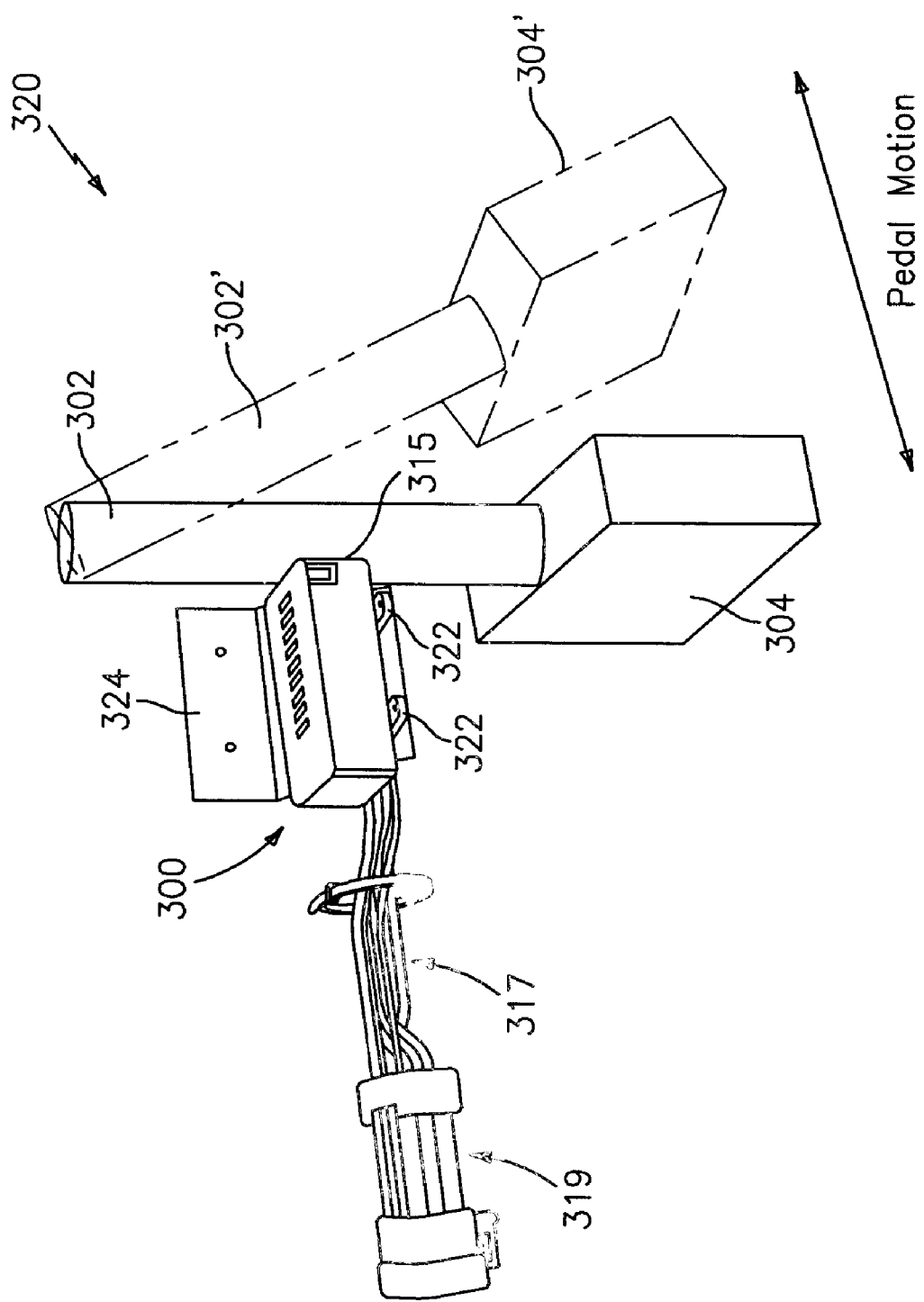
FIG. 3 is a schematic view of the brake pedal position sensor housing in operative relationship with a brake pedal of a motorized vehicle.

As shown in FIG. 3, a brake pedal mechanism 320 may be comprised of a ferromagnetic shaft 302 and brake pedal 304, and is adapted for movement adjacent the sensor housing 300 in response to its depression by a driver of a motorized vehicle. Numerals 302' and 304' illustrate the ferromagnetic shaft and brake pedal portions, respectively, when they are displaced from the rest position during operation. In this manner, fluctuations in the magnetic field incident upon the chip 210 due to the movement of either the ferromagnetic shaft 302 or the brake pedal 304 of the brake pedal mechanism 320 are accurately detected by the Hall effect transistor 215. It will be readily appreciated that the specific thickness of the fiber pad 315 varies in dependence upon the strength of the magnetic field generated by the permanent magnet 280, the particular ferromagnetic composition of the brake pedal mechanism 320, and the like.

The present invention also contemplates that the sensor housing 300 may be of any size or shape, wherein the preferred arrangement provides that, when employed for detection, the chip 210 is positioned between the permanent magnet 280 and a ferromagnetic portion of the brake pedal mechanism 320, as schematically illustrated in FIG. 4. It will be readily appreciated that the sensor housing 300 also preferably secures the constituent elements of the power supply circuit 220, the enabling circuit 230 and the engine control circuit 260. Thus, movement of the ferromagnetic portion of the brake pedal mechanism 320 serves to induce a fluctuation in the magnetic field of the permanent magnet 280 to thereby cause the Hall effect transistor 215 to change its outputted data state.

Tabs 322 are depicted in FIGS. 2 and 3 and are utilized to fixedly secure the sensor housing 300 to the body of the vehicle. As shown in FIG. 3, the sensor housing 300 may be fixed to the vehicle's body through the assistance of a bracket 324, or the like. It will be readily appreciated that the location and number of tabs 322 may be modified without departing from the broader aspects of the present invention.

It will also be readily appreciated that the interior of the sensor housing 300 may be sealed against environmental contaminants including dust, water and extreme temperatures ranging between −40° C. to 85° C. Protection of the brake pedal position circuit 200 may also be ensured by encapsulating the circuit board of the brake pedal position circuit 200 with a potting compound, or the like.

One important aspect, therefore, of the present invention is the fixed relationship between the Hall effect transistor 210 and the permanent magnet 280 within the sensor housing 300. By so fixing the relationship between the permanent magnet 280 and the Hall effect transistor 210, the magnetic field experienced by the Hall effect transistor 210 may be kept substantially constant, thereby reducing the potential for unintended activation of the braking system by the brake pedal position circuit 200.

Another important aspect of the present invention is the heretofore unknown configuration of a brake pedal sensor and electronic switch, which eliminates the need for mechanical contact between switching elements. The resultant switch is therefore more reliable and provides a greater repeatability of operation due to the elimination of physical wear upon constituent switching elements. Moreover, the secondary advantageous effects of employing a brake pedal sensor and electronic switch of the present invention include a reduction in maintenance and repair costs, both in parts and labor, as well as a reduction in warranty costs for manufacturers.

With reference to FIGS. 1–4 and the foregoing discussions of the same, the present invention contemplates utilizing a Hall effect transistor to detect the position of a ferromagnetic portion of a brake pedal mechanism in a motorized vehicle. When movement of the brake pedal mechanism is so detected, the brake lights of the vehicle are then activated without the need for mechanical contacts between electrical switching elements. The present invention therefore avoids the wear and environmental corruption, which typically affects these mechanical systems. By utilizing a permanent magnetic in fixed relation to the Hall effect transistor, the present invention substantially eliminates spontaneous activation of the braking system of the vehicle due to unintended fluctuations in the magnetic field incident upon the Hall effect transistor. Moreover, the use of MOSFET technology in conjunction with the Hall effect transistor advantageously allows for the switching of high current electrical components. The present invention also provides an additional measure of safety for those vehicles utilizing pressurized hydraulic or pneumatic braking systems by ensuring that these systems become operative even when the engine of the vehicle is off.

While the invention described above includes a Hall effect device, other forms of sensors can be adopted for use in the circuit of the present invention. For example, a capacitance sensor, an optical sensor, or other magnetic field sensors known to those so skilled in the art.

While the invention had been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:
1. A brake pedal position circuit, comprising:
   a brake pedal mechanism movably mounted in a motor vehicle and having a ferromagnetic portion;
   at least one magnet for generating a magnetic field;
   at least one Hall effect device for generating output data states that are dictated by variations in said magnetic field, said Hall effect device in fixed relation to said magnet;

a housing for said magnet and said Hall effect device, said housing being fixedly secured in the vehicle to provide a portion thereof in proximate relation to the brake pedal ferromagnetic portion when the brake pedal mechanism is in an "at rest" position; and said brake pedal mechanism being movable in the vehicle so as to change said magnetic field and cause a resulting change in the Hall effect device data state.

2. The brake pedal position circuit according to claim 1, further comprising:

a non-magnetic, non-conductive pad which abuts said ferromagnetic brake pedal portion when the brake pedal is in its "at rest" position.

3. The brake pedal position circuit according to claim 2, wherein:

said pad has a predetermined thickness indicative of a proper mounting distance between said housing and said ferromagnetic portion.

4. The brake pedal position circuit according to claim 3, wherein:

said ferromagnetic portion is one of a brake pedal of said vehicle and a shaft of said brake pedal mechanism.

5. The brake pedal position circuit according to claim 1, further comprising:

an enabling circuit in electrical communication with an electrical system of said vehicle; and said enabling circuit includes a first switching element capable of alternating between an electrically conductive state and an electrically non-conductive state in response to said data states generated by said Hall effect device.

6. The brake pedal position circuit according to claim 5, further comprising:

said enabling circuit permits passage of an electrical signal to a primary load of said vehicle when said first switching element is in said conductive state; and said enabling circuit prohibits passage of said electrical signal to said primary load of said vehicle when said first switching element is in said non-conductive state.

7. The brake pedal position circuit according to claim 6, wherein:

said first switching element includes a MOSFET; and said primary load is a brake light for said vehicle.

8. The brake pedal position circuit according to claim 6, wherein:

said enabling circuit attains said conductive state in response to said Hall effect device generating one of said data states; and said enabling section attains said non-conductive state in response to said Hall effect device generating another of said plurality of data states.

9. The brake pedal position circuit according to claim 8, wherein:

said one of said data states indicates that said Hall effect device is outputting a digitally low signal; and said another of said data states indicates that said Hall effect device is outputting a digitally high signal.

10. The brake pedal position circuit according to claim 5, further comprising:

said enabling circuit permits passage of an electrical signal to a primary load of said vehicle when said Hall effect device generates a digital 'low' signal; and said enabling circuit prohibits passage of said electrical signal to said primary load of said vehicle when said Hall effect device generates a digital 'high' signal.

11. The brake pedal position circuit according to claim 5, further comprising:

an engine control circuit in electrical communication with said electrical system of said vehicle; and said engine control circuit includes a second switching element capable of alternating between an electrically conductive state and an electrically non-conductive state in response to said data states generated by said Hall effect device.

12. The brake pedal position circuit according to claim 11, wherein:

said engine control circuit selectively enables operation of a braking system of said vehicle when said second switching element is in said non-conductive state.

13. The brake pedal position circuit according to claim 12, wherein:

said second switching element is a transistor in electrical communication with said braking system of said vehicle.

14. The brake pedal position circuit according to claim 12, wherein:

said braking system includes means for pressurizing said braking system; and said engine control circuit selectively energizes said means for pressurizing.

15. The brake pedal position circuit according to claim 12, wherein:

said second switching element attains said non-conductive state in response to said Hall effect device outputting a digitally low signal.

16. A method for controlling a braking system of a motorized vehicle by detecting an operation of a brake pedal mechanism of said vehicle, said method comprising the steps of:

orienting a magnet in fixed relationship in the vehicle, and maintaining a magnetizable portion of said brake pedal mechanism in movable relation to the vehicle;

orienting a magnetic field sensor adjacent said magnet so that a magnetic field emanating from said magnet is incident upon said sensor, said sensor being capable of selectively issuing a first electronic data state when said brake pedal mechanism is in a first position and issuing a second electronic data state when said brake pedal mechanism is in a second position;

providing an electrical circuit that is energized in response to movement of said magnetizable portion, wherein movement of said magnetizable portion from said first position causes fluctuations in said magnetic field incident upon said sensor thereby prompting generation of said second electrical data state; and maintaining a fixed relationship between said magnet and said sensor irrespective of movement of said magnetizable portion.

17. The method for controlling a braking system of a motorized vehicle according to claim 16, further comprising the steps of:

integrating a MOSFET with said sensor for energizing a brake light of said vehicle when said sensor issues said second data state.

18. The method for controlling a braking system of a motorized vehicle according to claim 16, further comprising the steps of:

energizing one of a hydraulic and a pneumatic pumps for pressurizing said braking system when said sensor issues said second data state.

19. The method for controlling a braking system of a motorized vehicle according to claim 16, further comprising the steps of:

energizing one of a hydraulic and a pneumatic pumps for pressurizing said braking system when an engine of said vehicle is not running and said sensor issues said second data state.

20. The method for controlling a braking system of a motorized vehicle according to claim 16, further comprising the steps of:

arranging said sensor and said magnet within an integrated housing; and securing a fibrous pad to an outer surface of said housing such that said fibrous pad is disposed adjacent to and facing said magnetizable portion.

21. The method for controlling a braking system of a motorized vehicle according to claim 16, further comprising the steps of:

forming said sensor to include a Hall effect transistor; and forming said magnet to include a permanent magnet.

22. A brake pedal position actuator for use in a motorized vehicle, said brake pedal position actuator comprising:

a magnetic field sensor for generating a plurality of data states;

a means for generating a magnetic field, said magnetic field generating means being in fixed relationship to said magnetic field sensor whereby said magnetic field is incident upon said magnetic field sensor;

said magnetic field sensor and said magnetic field generating means being oriented adjacent a ferromagnetic brake member of said vehicle wherein movement of said ferromagnetic brake member induces fluctuations in said magnetic field, thereby prompting said magnetic field sensor to generate one of said plurality of data states; and said magnetic field generating means maintaining said fixed relationship relative to said magnetic field sensor during said movement of said ferromagnetic brake member.

* * * * *